United States Patent
Neag et al.

(10) Patent No.: US 10,138,661 B2
(45) Date of Patent: Nov. 27, 2018

(54) INGRESS AND EGRESS AID THROUGH CHECK STRAP LATCH

(71) Applicants: Dorinel Neag, Commerce Township, MI (US); Carl Mather, Lake Orion, MI (US); Elaine M Herbon, Farmington Hills, MI (US); Kenric P Socks, Leonard, MI (US)

(72) Inventors: Dorinel Neag, Commerce Township, MI (US); Carl Mather, Lake Orion, MI (US); Elaine M Herbon, Farmington Hills, MI (US); Kenric P Socks, Leonard, MI (US)

(73) Assignee: FCA US LLC, Auburn Hills, MI (US)

( * ) Notice: Subject to any disclaimer, the term of this patent is extended or adjusted under 35 U.S.C. 154(b) by 448 days.

(21) Appl. No.: 14/220,658

(22) Filed: Mar. 20, 2014

(65) Prior Publication Data

US 2015/0267444 A1 Sep. 24, 2015

(51) Int. Cl.
*E05C 17/20* (2006.01)
*E05B 79/20* (2014.01)
(Continued)

(52) U.S. Cl.
CPC ............ *E05C 17/203* (2013.01); *B60N 3/023* (2013.01); *E05B 79/20* (2013.01); *E05B 85/12* (2013.01); *Y10T 16/61* (2015.01)

(58) Field of Classification Search
CPC ........ E05C 17/02; E05C 17/025; E05C 17/04; E05C 17/12; E05C 17/18; E05C 17/20;
(Continued)

(56) References Cited

U.S. PATENT DOCUMENTS

| | | | | |
|---|---|---|---|---|
| 3,100,122 | A * | 8/1963 | Knapp | E05B 77/00 292/266 |
| 3,869,158 | A * | 3/1975 | Ciciulla | E05B 77/48 16/344 |

(Continued)

FOREIGN PATENT DOCUMENTS

| | | | | |
|---|---|---|---|---|
| DE | 4025510 A1 * | 2/1992 | | E05C 17/203 |
| DE | 4207706 A1 * | 9/1993 | | E05C 17/203 |

(Continued)

OTHER PUBLICATIONS

Computer-Generated Translation for JP 2004-197379, generated on Jul. 19, 2016, https://worldwide.espacenet.com.*

(Continued)

*Primary Examiner* — Alyson M Merlino
(74) *Attorney, Agent, or Firm* — Ralph E. Smith (57) ABSTRACT

An ingress/egress aid for a vehicle having a vehicle body and a door movable relative to the vehicle body between an open state and a closed state is provided and includes a handle rotatably supported by the door between a non-actuated state and a deployed state. The handle extends from the door in the deployed state. A locking mechanism restricts rotation of the door relative to the vehicle body in a locked state and permits rotation of the door relative to the vehicle body in an unlocked state. The locking mechanism is movable from the unlocked state to the locked state when the door is in the open state and the handle is moved from the non-actuated state to the deployed state.

12 Claims, 8 Drawing Sheets

(51) Int. Cl.
   *E05B 85/12*   (2014.01)
   *B60N 3/02*    (2006.01)
(58) Field of Classification Search
   CPC ........ E05C 17/203; E05C 17/22; E05C 17/24;
       E05C 17/28; Y10T 292/28; Y10T
       292/285; Y10T 292/288; Y10T 292/289;
       Y10T 292/293; Y10T 292/2935; Y10T
       292/296; Y10T 292/297; Y10T 292/299;
       Y10T 292/305; Y10T 292/57; Y10T
       16/61; Y10T 16/6295; Y10S 292/15;
       Y10S 292/65; E05B 79/20; E05B 85/12;
       B60N 3/023
   USPC ...................................................... 296/146.1
   See application file for complete search history.

(56) References Cited

U.S. PATENT DOCUMENTS 8,876,172 B2 * 11/2014 Denison .............. E05B 47/0012
                                                      292/144

2002/0190539 A1 * 12/2002 Yu ...................... B60R 13/043
                                                      296/152
2006/0272216 A1 * 12/2006 Keane .................. E05C 17/203
                                                      49/381
2007/0245517 A1 * 10/2007 Kiefer .................. E05C 17/045
                                                      16/52
2011/0266080 A1 * 11/2011 Schmitt ................ E05C 17/006
                                                      180/89.1
2014/0117682 A1 *  5/2014 Konchan ................ E05B 79/20
                                                      292/336.3

FOREIGN PATENT DOCUMENTS

JP         2004197379 A  *  7/2004
WO    WO 2012075681 A1  *  6/2012    ............ E05C 17/203
WO    WO-2016103540 A1  *  6/2016    ............ E05B 79/20

OTHER PUBLICATIONS

Computer Generated Translation for DE 4025510, generated on Jan. 19, 2017 using https://worldwide.espacenet.com/.*

* cited by examiner

INGRESS AND EGRESS AID THROUGH CHECK STRAP LATCH

FIELD

The present disclosure relates to an apparatus for aiding ingress and egress through a door, and more particularly to an apparatus for aiding ingress and egress through a vehicle door using a handle-actuated check strap.

BACKGROUND

This section provides background information related to the present disclosure which is not necessarily prior art.

Conventional vehicle doors typically include a check strap that controls movement of the door relative to a vehicle. Such check straps limit movement of the door into an open position to prevent damage to the door and the vehicle caused by over-travel of the door. Further, such check straps also restrict rotation of the door relative to the vehicle when the door is moved from a closed position to an open position to prevent the door from inadvertently being moved into the closed position. The foregoing benefits are particularly useful when the vehicle is located on a grade, which causes the door to rapidly move from the closed position to the open position or from the open position to the closed position under the force of gravity.

While conventional check straps adequately control movement of a vehicle door between an open position and a closed position, such check straps do not restrict rotation of the door to the point where the door can be used as a point of assistance when entering or exiting the vehicle. For example, when a force is applied to a vehicle door having a conventional check strap by a person entering or exiting a vehicle (i.e., when the door is in an open position), the applied force overcomes the check strap and causes rotation of the door relative to the vehicle. Rotation of the door relative to the vehicle results in an unstable and moving structure that is not ideal for use as an aide when entering or exiting the vehicle.

Because conventional check straps do not prevent rotation of a vehicle door when the door is in an open position—other than a fully open position—vehicle manufacturers do not typically provide assist handles on vehicle doors. Rather, such handles are typically located on other, non-moving vehicle structure located proximate to a door opening such as an A-pillar or a roof header. Unfortunately, locating assist handles on vehicle structure proximate to a door opening reduces the overall aesthetics of the vehicle and complicates manufacturing of the vehicle as such components typically interfere with interior trim components. Further, such locations are not optimum locations for vehicle entry or exit, as some assist handles—particularly those attached to a roof header—may actually interfere with an occupant when entering or exiting the vehicle.

SUMMARY

An ingress/egress aid for a vehicle having a vehicle body and a door movable relative to the vehicle body between an open state and a closed state is provided and includes a handle rotatably supported by the door between a non-actuated state and a deployed state. The handle extends from the door in the deployed state. A locking mechanism restricts rotation of the door relative to the vehicle body in a locked state and permits rotation of the door relative to the vehicle body in an unlocked state. The locking mechanism is movable from the unlocked state to the locked state when the door is in the open state and the handle is moved from the non-actuated state to the deployed state.

A vehicle is provided and includes a vehicle body, a door rotatably supported by the vehicle body between an open state and a closed state, and a check strap extending between the vehicle body and the door that restricts rotation of the door when the door is in the open state. A locking mechanism engages the check strap to restrict rotation of the door relative to the vehicle body in a locked state when the door is in the open state and is disengaged from the check strap in an unlocked state to permit movement of the door relative to the vehicle body when the door is in the open state. The vehicle additionally includes a handle moveable between a non-actuated state and a deployed state. The locking mechanism is movable from the unlocked state to the locked state upon movement of the handle from the non-actuated state to the deployed state.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
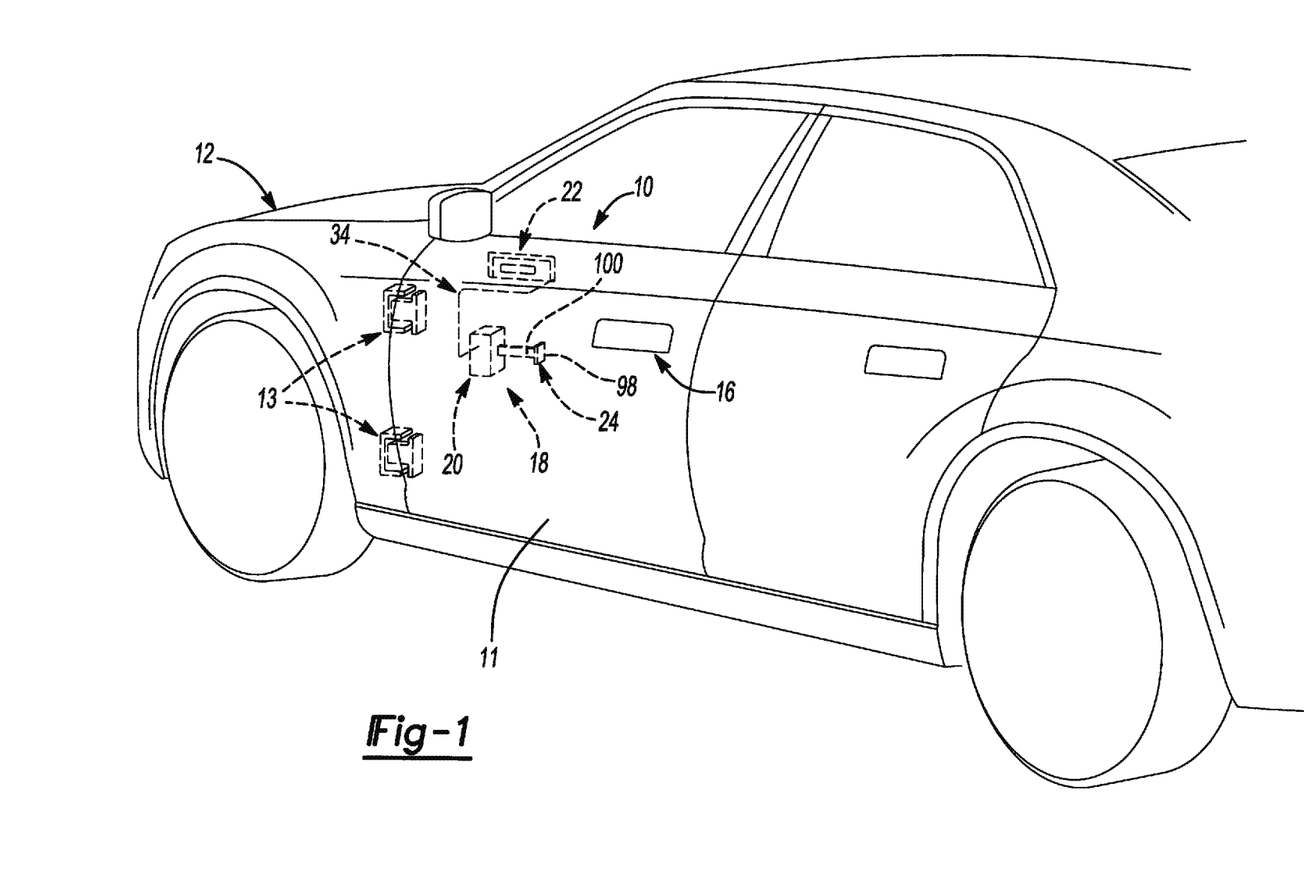
FIG. 1 is a perspective view of a vehicle including a door having an ingress/egress aid, in accordance with the principles of the present disclosure.
Figure 2:
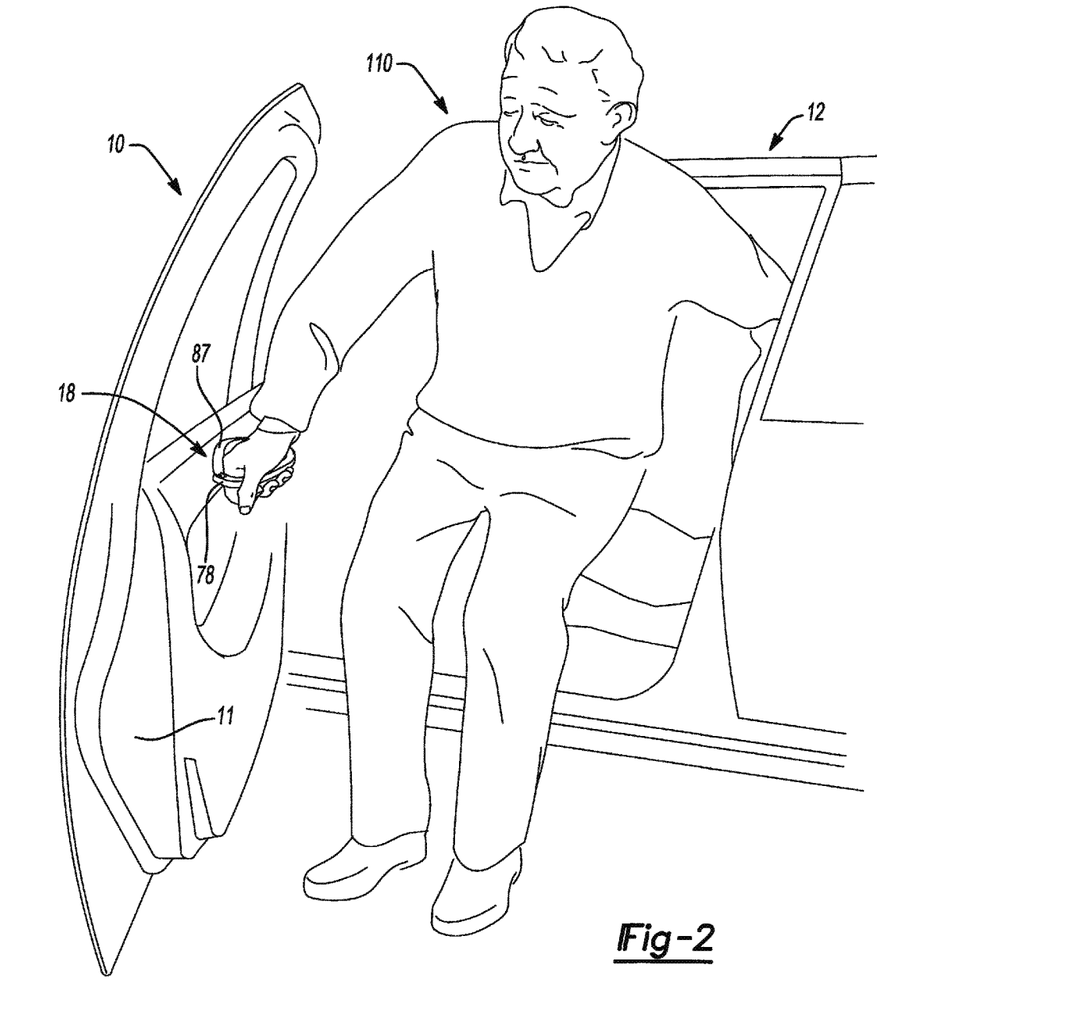
FIG. 2 is a perspective view of a person utilizing the ingress/egress aid of FIG. 1.
Figure 3:
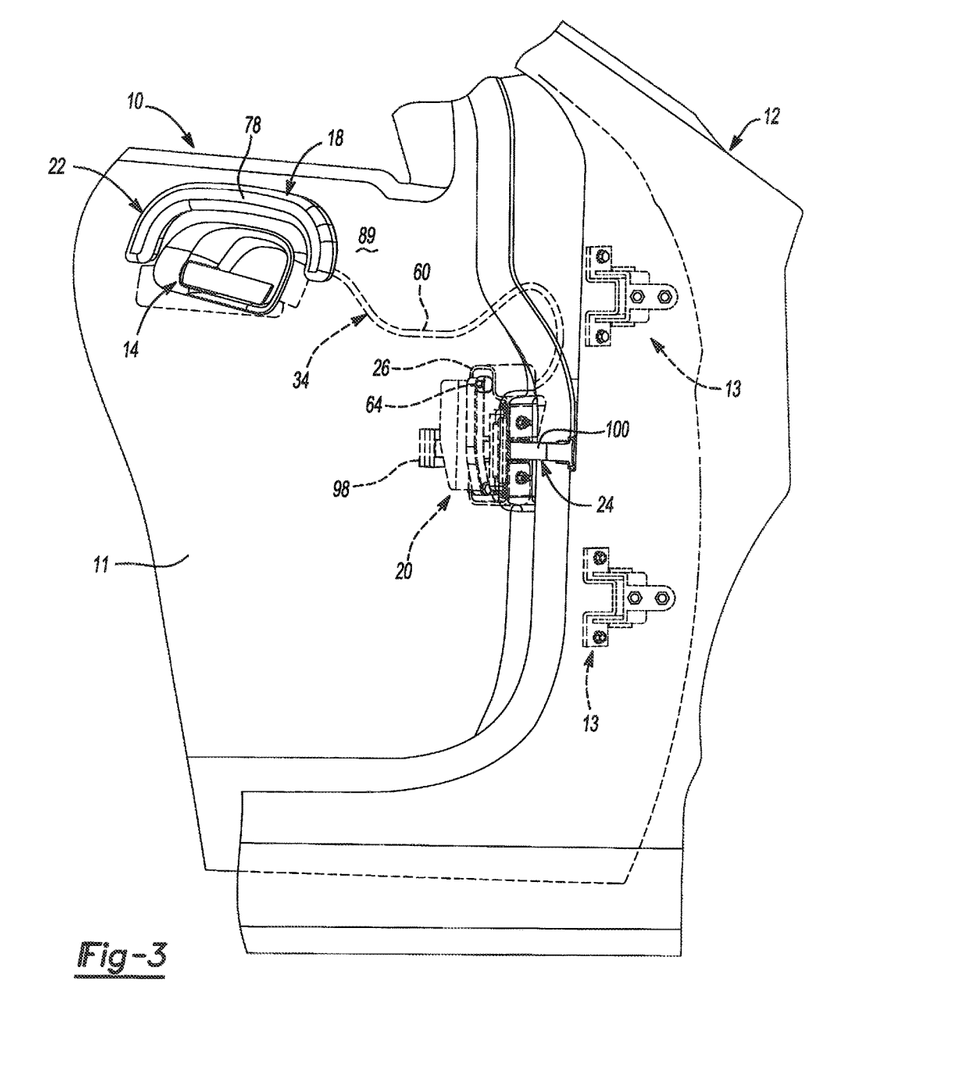
FIG. 3 is a partial side view of the door and the ingress/egress aid of FIG. 1
Figure 4:
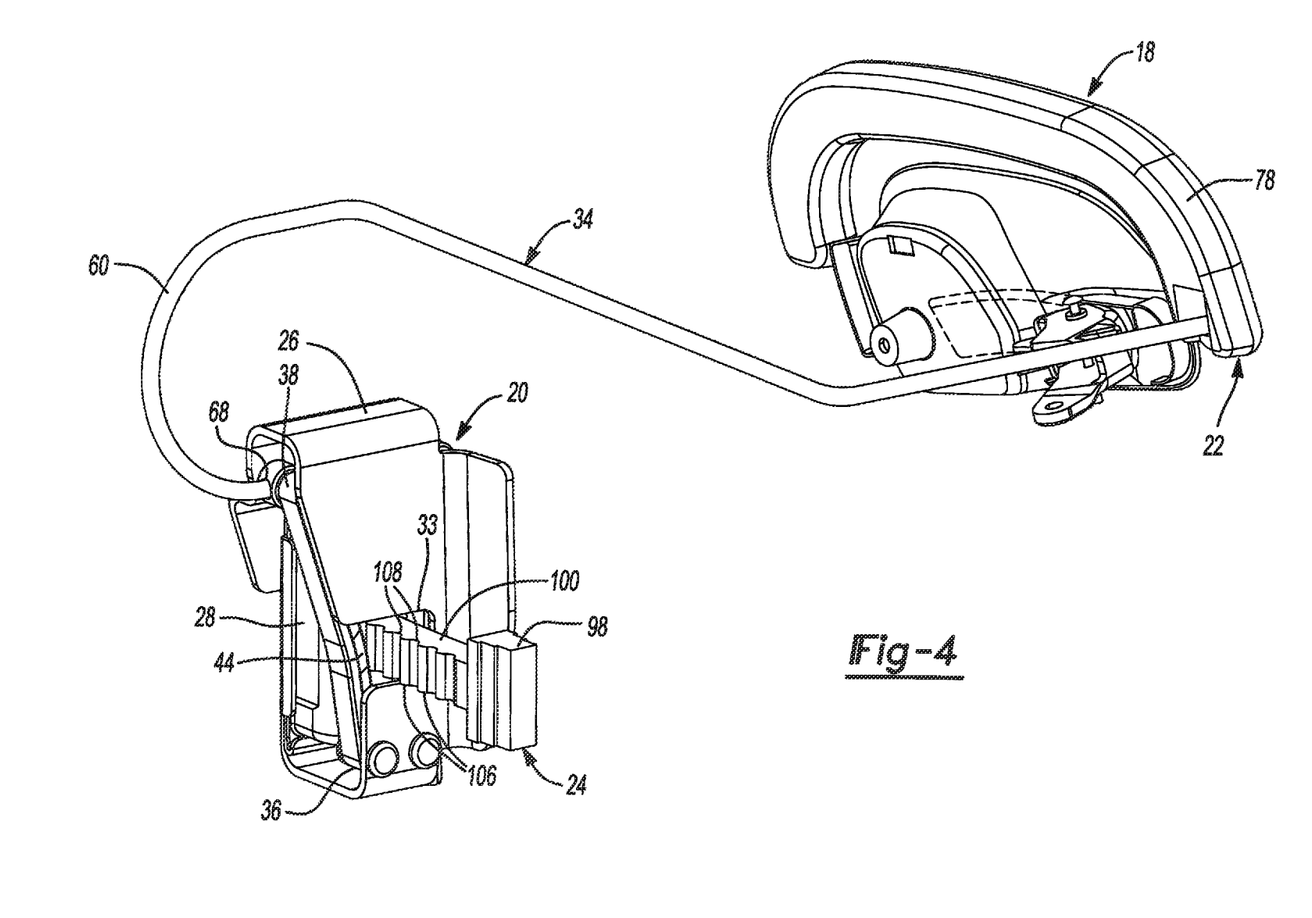
FIG. 4 is a perspective view of the ingress/egress aid of FIG. 1.

With reference to FIGS. 1-3, a door assembly 10 is provided and is pivotably coupled to a vehicle body 12 by at least one hinge 13. The vehicle body 12 may be a car, a truck, a trailer, a camper, or any other vehicle body where locking the door assembly 10 in a position relative to the vehicle body is desired. The door assembly 10 includes an inner door handle assembly 14, an outer door handle assembly 16, a latch assembly (not shown) that selectively fixes the door assembly 10 in a closed state relative to the vehicle body 12 (FIG. 1), and an ingress-egress aid assembly 18.

The door handle assembly 14 is operatively associated with an interior of a door 11 of the door assembly 10 and the second handle assembly 16 is operatively associated with an exterior of the door 11. The door handle assembly 14 and the second handle assembly 16 are operatively coupled to the latch assembly to selectively move the latch assembly between a latched state maintaining the door 11 in the closed state (FIG. 1) relative to the vehicle body 12 and an unlatched state permitting the door 11 to move from the closed state to an open state (FIG. 2) relative to the vehicle body 12.

With reference to FIGS. 3, 4, and 9-11, the ingress-egress aid assembly 18 includes a check assembly 20, an actuation assembly 22, and a check strap 24. As will be described below, the ingress-egress aid assembly 18 maintains the door assembly 10 in a plurality of open positions relative to the vehicle body 12 to prevent inadvertent movement of the door assembly 10 relative to the vehicle body 12.

The check assembly 20 includes a housing 26, a catch mechanism 28, a first catch arm 30, a second catch arm 32, and an actuation device 34. The housing 26 includes a slot 33 and is fixed to the door assembly 10 for movement with the door assembly 10 using mechanical fasteners (e.g., screws, bolts, rivets, etc.), adhesive, a weld, or any other suitable technique known in the art.

Figure 9:
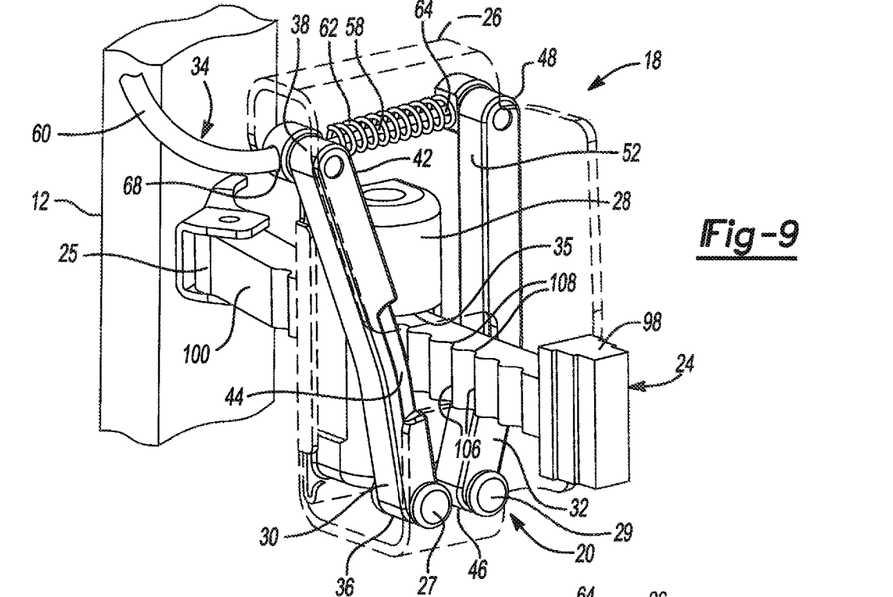
FIG. 9 is a partial perspective view of the ingress/egress aid of FIG. 1 shown in a relaxed state.
Figure 10:
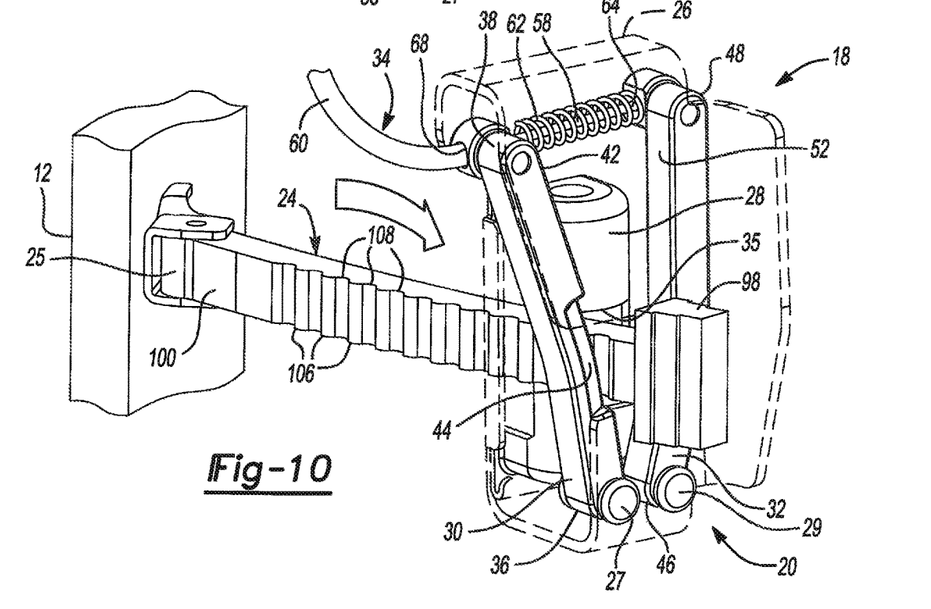
FIG. 10 is a partial perspective view of the ingress/egress aid of FIG. 1 shown in a relaxed state to permit movement of a check strap relative thereto.
Figure 11:
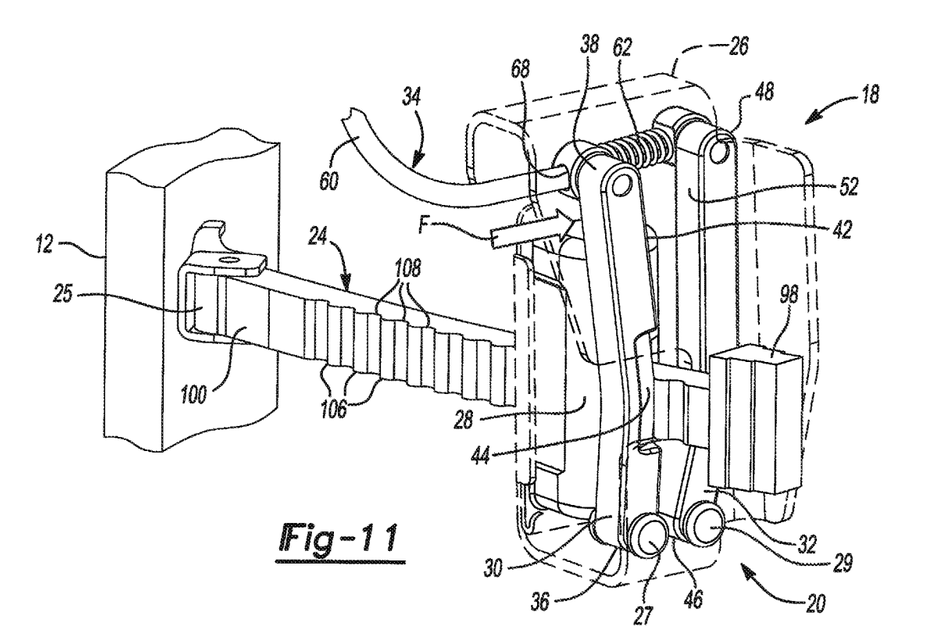
FIG. 11 is a partial perspective view of the ingress/egress aid of FIG. 1 shown in an actuated state.

The catch mechanism 28 is fixed to the housing 26 and defines an aperture 35 therethrough. The aperture 35 is substantially aligned with the slot 33 in the housing 26 to allow the check strap 24 to extend through the housing 26 and through the catch mechanism 28 (FIGS. 9-11). The catch mechanism 28 includes a first detent (not shown) and a second detent (not shown). The first and second detents are disposed on opposite sides of the aperture 35. The first detent is biased toward the second detent to apply a force on the check strap 24 disposed therebetween.

The first catch arm 30 extends from a proximal end 36 to a distal end 38. The proximal end 36 of the first catch arm 30 is pivotably coupled to the housing 26 using a pin 27. While a pin 27 is disclosed, any suitable device that permits rotation of the first catch arm 30 relative to the housing 26 may be used. For example, a bolt, rod, screw, or other suitable device may be used in place of the pin 27.

A first lateral side 42 of the first catch arm 30 faces the second catch arm 32 and includes at least one tapered wall 44, such that the first catch arm 30 includes a substantially V-shaped portion. The at least one tapered wall 44 is substantially aligned with the slot 33 in the housing 26.

The second catch arm 32 extends from a proximal end 46 to a distal end 48 and is pivotably coupled to the housing 26 at the proximal end 46 using a pin 29. While a pin 29 is disclosed, any suitable device that permits rotation of the second catch arm 32 relative to the housing 26 may be used. For example, a bolt, rod, screw, or other suitable device may be used in place of the pin 29.

A second lateral side 52 of the second catch arm 32 faces the first catch arm 30. In one configuration, the second lateral side 52 of the second catch arm 32 may include at least one tapered wall (not shown), such that the second catch arm 32 includes a substantially V-shaped portion in a similar fashion as the V-shaped portion of the first catch arm 30. The at least one tapered wall of the second catch arm 32 may be substantially aligned with the at least one tapered wall 44 of the first catch arm 30. As will be described below, the first catch arm 30 and the second catch arm 32 cooperate to form a locking mechanism that selectively engages the check strap 24 to restrict relative movement between the check strap 24 and the housing 26.

Figures 5, 6, 7:
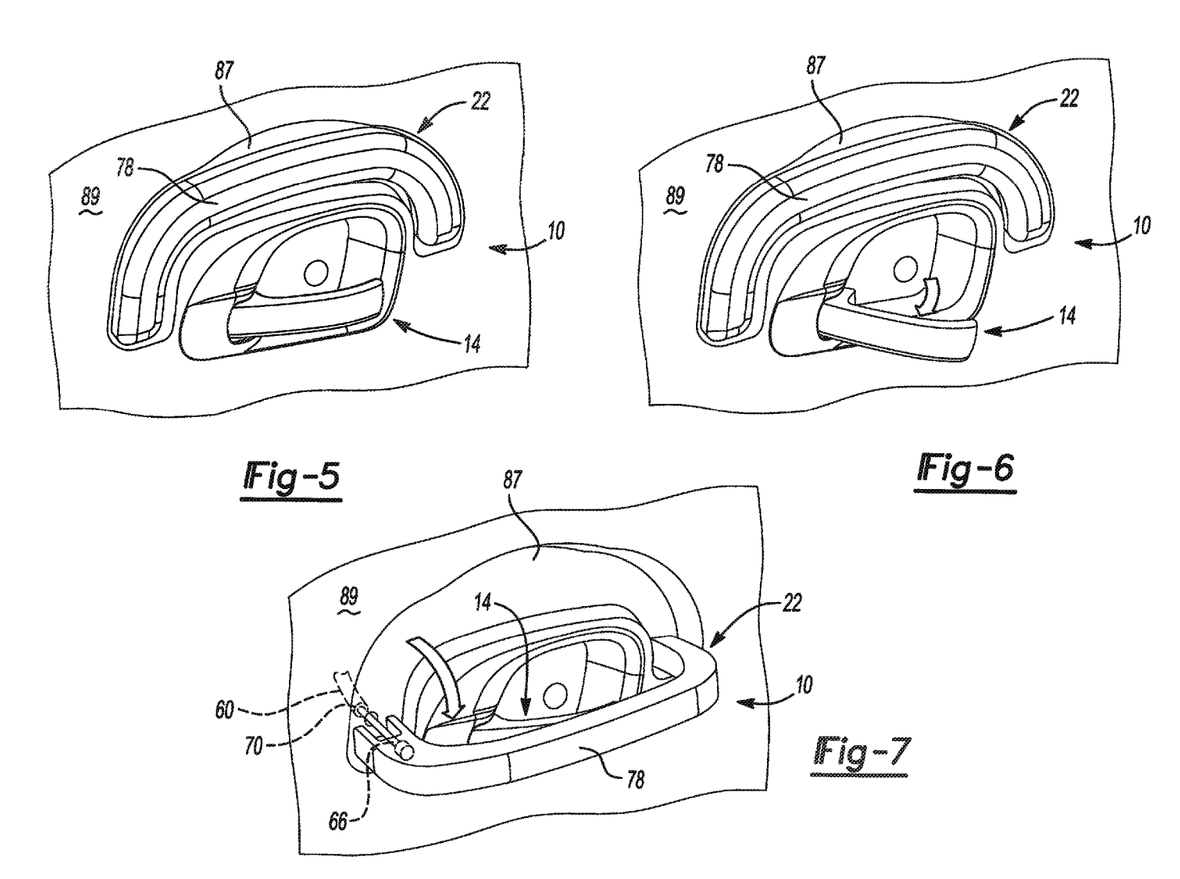
FIG. 5 is a perspective view of a door handle assembly and an assist handle assembly of the door of FIG. 1 with the door handle assembly and the assist handle assembly each shown in a relaxed state.
FIG. 6 is a perspective view of the door handle assembly and the assist handle assembly of FIG. 5 with the door handle assembly shown in an actuated state and the assist handle assembly shown in a relaxed state.
FIG. 7 is a perspective view of the door handle assembly and the assist handle assembly of FIG. 5 with the door handle assembly shown in a relaxed state and the assist handle assembly shown in an actuated state.

The actuation device 34 includes a first member 58, a second member 60, and a biasing member 62. In one configuration, the first member 58 is a transmission element such as a cable or other similar tether that extends longitudinally between a first or proximal end 64 and a second or distal end 66 (FIG. 7). The second member 60 is a generally hollow tubular member, or cable housing, extending between a first or proximal end 68 and a second or distal end 70 (FIG. 7), and is coaxially disposed about the first member 58.

The first member 58 is longer than, and is slidably disposed within, the second member 60. While the actuation device 34 is described herein as a generally including a cable, or first member 58, extending longitudinally through a cable housing, or second member 60, the actuation device 34 may include other forms within the scope of the present teachings. For example, the actuation device 34 may include at least one solenoid, servo motor, or other suitable device for rotating the first catch arm 30 about the proximal end 36 and rotating the second catch arm 32 about the proximal end 46.

The first member 58 is slidably disposed through the distal end 38 of the first catch arm 30 to allow the first end 64 of the first member 58 to be attached to the distal end 48 of the second catch arm 32. The first end 68 of the second member 60 is mounted to the distal end 38 of the first catch arm 30. The biasing member 62 is mounted between the first catch arm 30 and the second catch arm 32 to bias the first catch arm 30 in a first direction, generally away from the second catch arm 32 and the check strap 24. As illustrated, in one configuration, the biasing member 62 is a coil spring extending between the first catch arm 30 and the second catch arm 32, and is coaxially disposed about the first member 58. In this way, the biasing member 62 biases the first catch arm 30 away from the second catch arm 32 and into a relaxed or non-actuated state (FIG. 9).

With reference to FIGS. 5-7, the actuation assembly 22 includes an actuation member or assist handle 78. The assist handle 78 is movable relative to the door handle 14 between a relaxed or non-actuated state (FIGS. 5 and 6) and an actuated or deployed state (FIG. 7). As shown in FIG. 7, the second end 66 of the first member 58 is mounted to the assist handle 78. Accordingly, when the assist handle 78 is moved from the relaxed state to the deployed state, a force is applied to the first member 58, thereby placing the first member 58 under tension. Placing the first member 58 under tension causes the first member 58 to move relative to and within the second member 60, as the second end 70 of the second member 60 is mounted to the door assembly 10 and, as such, is fixed for movement with the door assembly 10 and does not move along with the first member 58.

Figure 8:
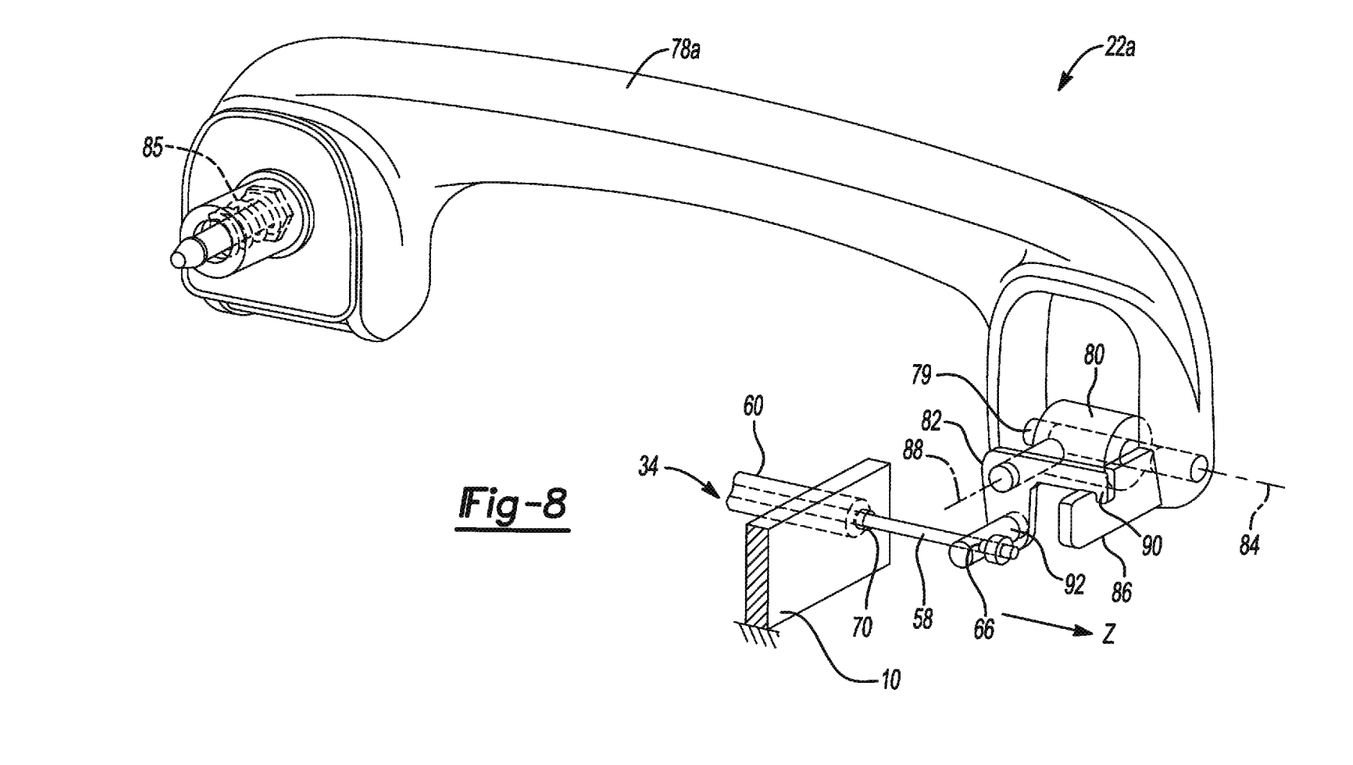
FIG. 8 is a perspective view of another configuration of the assist handle assembly of FIG. 5.

With reference to FIG. 8, another actuation assembly 22a is provided and includes an actuation member or assist handle 78a, a dampener 80, and an actuation lever 82. In view of the substantial similarity in structure and function of the components associated with the actuation assembly 22 with respect to the actuation assembly 22a, like reference numerals are used hereinafter and in the drawings to identify like components while like reference numerals containing letter extensions are used to identify those components that have been modified.

The assist handle 78a is pivotably coupled to the door assembly 10 with at least one pin 79 or similar device, for rotation about an axis 84. In one configuration, the assist handle 78a is pivotably coupled to the door assembly 10 using two pins 79 defining the axis 84. The assist handle 78a includes a lever arm 86 that is fixed for rotation with the assist handle 78a. The lever arm 86 extends from the assist handle 78a in a direction substantially perpendicular to the axis 84. The dampener 80 reduces the angular acceleration of the assist handle 78a about the axis 84 to allow the assist handle 78a to return from a deployed state (not shown) to a relaxed or non-actuated state (FIG. 8) in a controlled manner. In one configuration, the dampener 80 is coaxially disposed about the axis 84.

The actuation assembly 22a also includes at least one biasing member 85 that biases the assist handle 78 about the axis 84 and into the relaxed position. The biasing member 85 may be disposed between the assist handle 78a and the door assembly 10 to allow the biasing member 85 to exert a force on the assist handle 78a to automatically return the assist handle 78a to the non-actuated state from the deployed state when a force applied to the assist handle 78a is released.

The actuation lever 82 is pivotably coupled to the door assembly 10 for rotation about an axis 88. The axis 88 is substantially perpendicular to the axis 84. The actuation lever 82 includes a first arm 90 and a second arm 92. The first arm 90 is substantially perpendicular to the axis 88. The second arm 92 is substantially perpendicular to the first arm 90 and to the axis 84. The second end 66 of the first member 58 is attached to the second arm 92 for movement therewith. The second end 70 of the second member 60 is mounted to the door assembly 10.

In operation, when the assist handle 78a is rotated about axis 84, the lever arm 86 is rotated therewith. Rotation of the lever arm 86 applies a force on the actuation lever 82 at the first arm 90, thereby causing the actuation lever 82 to rotate about axis 88. Rotation of the actuation lever 82 about axis 88 causes movement of the second arm 92 in the direction (Z), as shown in FIG. 8. Movement of the second arm 92 in the direction (Z) exerts a force on the first member 58, thereby placing the first member 58 under tension and causing the first member 58 to move relative to and within the second member 60.

Regardless of whether the door assembly 10 includes the actuation assembly 22 or the actuation assembly 22a, the door assembly 10 further includes a channel or pocket 87 that receives the assist handle 78, 78a. While either actuation assembly 22, 22a may be used in conjunction with the door assembly 10, the door assembly 10 will be described hereinafter as incorporating the actuation assembly 22.

In the non-actuated or relaxed position (FIGS. 5 and 6), the assist handle 78 is disposed within the pocket 87, such that the assist handle 78 is substantially flush or recessed relative to an interior surface 89 of the door assembly 10. The assist handle 78 may be disposed proximate to the door handle 14, so that the assist handle 78 and the door handle 14 are readily accessible in the same general location. For example, the assist handle 78 may at least partially surround the door handle 14, as shown in FIG. 5.

The check strap 24 includes a head portion 98 and a body portion 100. The head portion 98 is monolithically formed with the body portion 100 and is pivotably attached to the vehicle body 12 at an end 25 of the body portion 100. The body portion 100 includes at least one substantially corrugated pattern, defining a plurality of peaks 106 and a plurality of valleys 108.

In an assembled configuration, the body portion 100 is pivotably coupled to the vehicle body 12 at the end 25 of the body portion 100. The body portion 100 extends through the aperture 35 of the catch mechanism 28, between the first and second catch arms 30, 32, and through the slot 33 of the housing 26, such that the plurality of peaks 106 and the plurality of valleys 108 are substantially aligned with the at least one tapered wall 44 of the first catch arm 30 and/or the at least one tapered wall of the second catch arm 32.

In operation, the first detent and the second detent apply a force on the check strap 24 to restrict movement of the check strap 24 relative to the housing 26. Because the housing 26 is fixed for movement with the door assembly 10, restricting movement of the check strap 24 relative to the housing 26 likewise restricts rotation of the door assembly 10 relative to the vehicle body 12. Specifically, when the door assembly 10 is rotated relative to the vehicle body 12 about the hinge 13, the first detent and the second detent move along the body portion 100 of the check strap 24 moving into and out of consecutive valleys 108 and over consecutive peaks 106 until a desired position of the door assembly 10 relative to the vehicle body 12 is achieved.

Once a desired position of the door assembly 10 relative to the vehicle body 12 is achieved, a force applied to the door assembly 10 is released and the first detent and the second detent are received within respective valleys 108 of the body portion 100. In this position, the first detent and the second detent exert a force on the check strap 24 at the particular valleys 108 and, as such, restrict movement of the check strap 24 relative to the housing 26. In so doing, the first detent and the second detent—in cooperation with the particular valleys 108—restrict rotation of the door assembly 10 relative to the vehicle body 12.

Rotation of the door assembly 10 relative to the vehicle body 12 is accomplished when a sufficient force is applied to the door assembly 10 to overcome the force exerted on the check strap 24 by the first detent and the second detent at the particular valleys 108. The force applied to the door assembly 10 must be sufficient enough to allow the first detent and the second detent to be removed from the particular valleys 108 and traverse the peaks 106 to permit relative movement of the check strap 24 and the housing 26. Namely, the force applied to the door assembly 10 must be sufficient enough to allow the first detent and the second detent to be removed from the particular valleys 108 and move along the check strap 24, as the housing 26—attached to the door assembly 10 for movement therewith—moves relative to and along the body portion 100 of the check strap 24.

With particular reference to FIGS. 5-7 and 9-12, operation of the ingress-egress aid assembly 18 will be described in detail. Under normal operating conditions, the assist handle 78 is in the non-actuated state (FIG. 5) and the door handle 14 is likewise in the non-actuated state. When the handles 14, 78 are in the non-actuated state, the door assembly 10 may be in a closed state relative to the vehicle body 12 (FIG. 1).

The door assembly 10 may be moved from the closed state (FIG. 1) to the open state (FIG. 2) by rotating the door handle 14 from the non-actuated state (FIG. 5) to the actuated state (FIG. 6) to release the latch mechanism associated with the door assembly 10. Upon release of the latch mechanism, a force may be applied to the door assembly 10 to rotate the door assembly 10 about the hinge 13 relative to the vehicle body 12. When the door assembly 10 is rotated relative to the vehicle body 12, the housing 26 is likewise rotated with the door assembly 10. Accordingly, the first detent and the second detent associated with the housing 26 move along the check strap 24 until a desired position of the door assembly 10 relative to the vehicle body 12 is achieved.

When a desired position of the door assembly 10 relative to the vehicle body 12 is achieved, the force applied to the door assembly 10 is released. Upon release of the force, the first detent and the second detent are received within respective valleys 108 along the length of the body portion 100 of the check strap 24 to restrict inadvertent movement of the door assembly 10 relative to the vehicle body 12. Namely, the biasing force exerted on the check strap 24 by the first detent and the second detent maintains the first detent and the second detent within particular valleys 108 of the check strap 24, thereby restricting movement of the door assembly 10 relative to the vehicle body 12 until a sufficient force is applied to the door assembly 10 to rotate the door assembly 10 relative to the vehicle body 12.

When the door assembly 10 is in the open state (FIG. 2), a force may be applied to the assist handle 78 to rotate the assist handle 78 from the non-actuated state (FIGS. 5 and 6) to the deployed state (FIG. 7). When the assist handle 78 is rotated into the deployed state (FIG. 7), the first member 58 is moved relative to and within the second member 60. In so doing, a force is applied to the first catch arm 30, thereby causing the first catch arm 30 to move toward the second catch arm 32 in a direction (F), as shown in FIG. 11. Movement of the first catch arm 30 toward the second catch arm 32 causes the tapered wall 44 to engage a particular valley 108 of the check strap 24, thereby clamping the check strap 24 between the first catch arm 30 and the second catch arm 32. While the door assembly 10 is described in conjunction with the actuation assembly 22, the door assembly 10 could be described in conjunction with the actuation assembly 22a, whereby rotation of the assist handle 78a in the manner described above similarly places the first member 58 under tension and causes the first catch arm 30 and the second catch arm 32 to clamp the check strap 24 therebetween.

Clamping the check strap 24 between the first catch arm 30 and the second catch arm 32 restricts movement of the check strap 24 relative to the housing 26 until the force applied to the assist handle 78 is released. The force exerted on the check strap 24 via the first catch arm 30 and the second catch arm 32 is greater than the force exerted on the check strap 24 by the first detent and the second detent and, as such, serves to further restrict rotation of the door assembly 10 relative to the vehicle body 12. Namely, the clamping force exerted on the check strap 24 by the first catch arm 30 and the second catch arm 32 is sufficient to allow the user 110 to use the assist handle 78 as a support when entering or exiting the vehicle without causing rotation of the door assembly 10 relative to the vehicle body 12.

When the force applied to the assist handle 78 is removed, a biasing member—similar to the biasing member (85) associated with the actuation mechanism 22a—may be used to return the assist handle 78 to the non-actuated state shown in FIGS. 5 and 6. At this point, the assist handle 78 and the door handle 14 are both in the non-actuated state (FIG. 5) and the door may be returned to the closed state (FIG. 1).

Figure 12:
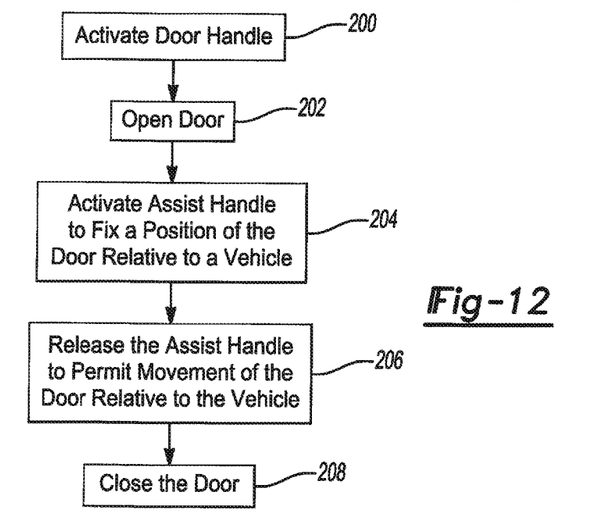
FIG. 12 is a flow diagram of a method of operating the door and ingress/egress aid of FIG. 1.

In sum, and with particular reference to FIG. 12, a user 110 may activate the door handle 14 at 200 to allow the door assembly 10 to be moved from the closed state (FIG. 1) to the open state (FIG. 2) at 202. Once the door assembly 10 is in the open state, the assist handle 78 may be moved from the non-actuated state (FIGS. 5 and 6) to the actuated or deployed state (FIG. 7) at 204 to allow the user 110 to use the assist handle 78 as an aid when exiting the vehicle. The force applied to the assist handle 78 may be released at 206 to allow the assist handle 78 to be returned to the non-actuated state and the door may subsequently be closed at 208.

The foregoing description provides an assist handle 78 that is movable from a non-actuated state to a deployed state and is carried by a door assembly 10 of a vehicle. The assist handle 78 may be used to support the weight of a user 110 when entering or exiting the vehicle without causing concurrent movement of the door assembly 10 relative to the vehicle body 12. Such movement of the door assembly 10 relative to the vehicle body 12 is prevented, as movement of the assist handle 78 from the non-actuated state to the deployed state likewise causes a clamping force to be applied to the check strap 24. The clamping force restricts movement of the housing 26 relative to the check strap 24 and, in so doing, restricts rotation of the door assembly 10 relative to the vehicle body 12, thereby allowing the user 110 to apply a force on the door assembly 10 without causing concurrent movement of the door assembly 10 relative to the vehicle body 12.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle comprising:
a vehicle body;
a door rotatably supported by said vehicle body and rotatable relative to the vehicle body along a path between an open state and a closed state;
an interior door handle operatively associated with an interior of the door and actuable to unlatch the door to an unlatched state permitting the door to rotate from the closed state toward the open state;
a check strap extending between said vehicle body and said door and operable to restrict rotation of said door relative to the vehicle body;
a locking mechanism operable between a locked state, engaging said check strap to restrict rotation of said door relative to said vehicle body when said door is rotated between said closed state and said open state, and an unlocked state, disengaged from said check strap to permit rotation of said door relative to said vehicle body;
an assist handle moveable between a non-actuated state and a deployed state, said locking mechanism movable from said unlocked state to said locked state upon movement of said assist handle from said non-actuated state to said deployed state; and
wherein said assist handle is moveable from said non-actuated state to said deployed state to move said locking mechanism from said unlocked state to said locked state at any position of the door along the path the door travels between the closed state and the open state.

2. The vehicle of claim 1, wherein said assist handle is supported by said door.

3. The vehicle of claim 2, further comprising a transmission element extending between said assist handle and said locking mechanism, said transmission element operable to move said locking mechanism from said unlocked state to said locked state when said assist handle is moved from said non-actuated state to said deployed state.

4. The vehicle of claim 3, wherein said transmission element is a cable.

5. The vehicle of claim 1, wherein said check strap restricts rotation of the door relative to the vehicle body when said locking mechanism is in said unlocked state and when said locking mechanism is in said locked state.

6. The vehicle of claim 1, wherein said locking mechanism includes a first arm and a second arm, said first arm and said second arm applying a clamp force to said check strap in said locked state to restrict rotation of said door relative to said vehicle body.

7. The vehicle of claim 6, further comprising a transmission element extending between said assist handle and at least one of said first arm and said second arm, said transmission element operable to move said locking mechanism into said locked state by moving one of said first arm and said second arm toward the other of said first arm and said second arm to apply said clamp force to said check strap.

8. The vehicle of claim 1, further comprising at least one detent operable to engage said check strap when said door is in said open state to restrict rotation of said door relative to said vehicle body.

9. The vehicle of claim 8, wherein said at least one detent restricts rotation of said door when said door is in said open state and said locking mechanism is in either of said unlocked state or said locked state.

10. The vehicle of claim 1, wherein said assist handle extends from said door when said assist handle is in said deployed state.

11. The vehicle of claim 1, wherein said assist handle is biased into said non-actuated state.

12. The vehicle of claim 1, wherein said assist handle is received within a recess of said door when said assist handle is in said non-actuated state.

* * * * *